United States Patent
Garton et al.

(10) Patent No.: US 12,150,407 B2
(45) Date of Patent: Nov. 26, 2024

(54) REAL-TIME BELT FAILURE DETECTION

(71) Applicant: Deere & Company, Moline, IL (US)

(72) Inventors: Michael S. Garton, East Moline, IL (US); Alexander B. Lassers, Davenport, IA (US)

(*) Notice: Subject to any disclaimer, the term of this patent is extended or adjusted under 35 U.S.C. 154(b) by 1133 days.

(21) Appl. No.: 16/850,091

(22) Filed: Apr. 16, 2020

(65) Prior Publication Data

US 2021/0321568 A1   Oct. 21, 2021

(51) Int. Cl.
*A01D 41/127* (2006.01)
*A01D 75/18* (2006.01)

(52) U.S. Cl.
CPC ....... *A01D 41/1274* (2013.01); *A01D 75/182* (2013.01)

(58) Field of Classification Search
CPC ............... A01D 34/006; A01D 41/127; A01D 41/1274; A01D 69/00–12; A01D 75/182; A01F 12/56

See application file for complete search history.

(56) References Cited

U.S. PATENT DOCUMENTS

| | | | |
|---|---|---|---|
| 4,893,241 A * | 1/1990 | Girodat | A01D 41/1274 56/10.2 G |
| 5,855,108 A * | 1/1999 | Salz | A01D 75/182 56/10.2 G |
| 7,573,219 B2 | 8/2009 | Kees et al. | |
| 7,974,749 B2 * | 7/2011 | Zettel | B60W 20/15 701/33.5 |
| 8,019,501 B2 | 9/2011 | Breed | |
| 8,112,193 B2 | 2/2012 | Yurgil | |
| 8,356,207 B2 | 1/2013 | Hosek et al. | |
| 8,447,449 B2 | 5/2013 | Prucka et al. | |
| 8,478,474 B2 | 7/2013 | Matsui et al. | |
| 8,527,157 B2 * | 9/2013 | Imhof | A01D 57/20 56/10.2 J |

(Continued)

FOREIGN PATENT DOCUMENTS

| | | |
|---|---|---|
| EP | 2707625 81 | 9/2019 |
| EP | 3323658 A1 | 11/2021 |

(Continued)

OTHER PUBLICATIONS

M. Musselman, D. Djurdjanovic, Tension monitoring in a belt-driven automated material handling system, CIRP Journal of Manufacturing Science and Technology, vol. 5, Issue 1, 2012, pp. 67-76. [retrieved on Jun. 13, 2024]. Retrieved from the Internet:<URL: https://www.sciencedirect.com/science/article/pii/ S1755581711001015>.

(Continued)

*Primary Examiner* — Adam J Behrens
(74) *Attorney, Agent, or Firm* — Kelly, Holt & Christenson; Joseph R. Kelly

(57) ABSTRACT

A belt load characterization system receives a belt slip detector signal indicative of belt slip, and identifies, in near real-time, a severity level and impact of the belt load characteristics. A notification system generates an operator interface mechanism control signal to surface a notification to the operator indicative of the belt load characteristics, and the severity level and impact of those characteristics. The machine can be controlled based on the belt load as well.

18 Claims, 9 Drawing Sheets

(56) References Cited

U.S. PATENT DOCUMENTS

| | | | |
|---|---|---|---|
| 8,903,598 B2 | 12/2014 | Wu et al. | |
| 9,182,300 B2 | 11/2015 | Themm et al. | |
| 9,334,932 B2 | 5/2016 | Antchak et al. | |
| 9,633,491 B2 | 4/2017 | Wonderlich | |
| 9,795,081 B2* | 10/2017 | Middelberg | A01D 41/1274 |
| 9,811,809 B2 | 11/2017 | Sakuragi | |
| 9,989,129 B2 | 6/2018 | Antchak et al. | |
| 2014/0278159 A1 | 9/2014 | Chinnadurai | |
| 2016/0066506 A1* | 3/2016 | Middelberg | A01D 41/1274 |
| | | | 460/6 |
| 2017/0166197 A1 | 6/2017 | Jang | |
| 2017/0307051 A1 | 10/2017 | Petridis et al. | |
| 2017/0359953 A1 | 12/2017 | Wallace et al. | |
| 2018/0119790 A1 | 5/2018 | Kanduri et al. | |
| 2019/0034855 A1 | 1/2019 | Halioris | |

FOREIGN PATENT DOCUMENTS

| | | |
|---|---|---|
| FR | 3026805 A1 | 4/2016 |
| WO | 2018059755 A1 | 4/2018 |

OTHER PUBLICATIONS

Brown, R. E., The development of an electronic system to continually monitor, indicate and control, 'belt slippage' in industrial friction 'V' belt drive transmission systems, Journal of Physics: Conference Series, vol. 364, Issue 1; article id. 012055, (2012), 10 pages.

Yilu Zhang, S. Rajagopalan and M. Salman, A practical approach for belt slip detection in automotive electric power generation and storage system, 2010 IEEE Aerospace Conference, Big Sky, MT, 2010, pp. 1-7, doi:10.1109/AERO.2010.5446832.

Continental and CLAAS Jointly Test Smart Belts for Enhanced Harvesting Efficiency and Reliability. [Online] Hanover; Aug. 26, 2019 [retrieved on Jun. 13, 2024]. Press Release Retrieved from the Internet: <https://www.continental.com/en/press/press-releases/continental-and-claas-jointly-test-smart-belts/>, 4 pages.

\* cited by examiner

REAL-TIME BELT FAILURE DETECTION

FIELD OF THE DESCRIPTION

The present description relates to mobile work machines. More specifically, the present description relates to a detection system that detects belt load issues on belt driven subsystems of the mobile work machine and generates control signals based upon the detected belt load.

BACKGROUND

There are a wide variety of different types of mobile work machines. They can include agricultural machines, construction machines, forestry machines, turf management machines, among others. Many of these machines have subsystems that are belt driven.

Considering an example in which the mobile work machine is a combine harvester, there are many belt driven subsystems. For instance, those subsystems can include a rotor, a cleaning shoe, an unloading auger, a feeder house, a chopper, an engine fan, a clean grain elevator, a discharge beater, among others. Some of the belt drive systems, that drive those subsystems, can be located on a combine harvester in positions that make them difficult to service. Therefore, when belt failures occur, it can result in an undesirable amount of downtime for the combine harvester, which can be quite costly.

The discussion above is merely provided for general background information and is not intended to be used as an aid in determining the scope of the claimed subject matter.

SUMMARY

A belt load characterization system receives a belt slip detector signal indicative of belt slip, and identifies, in near real-time, a severity level and impact of the belt load characteristics. A notification system generates an operator interface mechanism control signal to surface a notification to the operator indicative of the belt load characteristics, and the severity level and impact of those characteristics. The machine can be controlled in other ways based on the belt load as well.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, combine harvesters have a relatively large number of belt drive systems that drive belt driven members. Therefore, belt failures can be relatively frequent. It is often difficult for an operator to have any advanced warning that belt performance of any of the belts is compromised. Therefore, belt failure can occur at highly inconvenient locations and at highly inconvenient times. Harvester downtime is also quite costly. It can take hours or longer to perform maintenance on some of the belt drive systems in a combine harvester.

A significant way in which belts are damaged (and which thus reduces belt life for a belt driven system) is due to belt slip. For instance, when a belt is driving a driven mechanism and the belt begins to slip, for any reason, then when the belt reengages with the driven mechanism, this generates a relatively high, transitionary load (or load spike) on the belt. Thus, belt slip can reduce the belt life by orders of magnitude.

One way that is currently used to detect belt slip is operator perception. For instance, an experienced operator may notice a lurching or a shutter in the operator compartment of the harvester, when a belt slips. In addition, operators routinely inspect some of the belts, and thus belt damage can be observed during a physical inspection.

The present description thus proceeds with respect to a system that automatically detects belt slippage. It can identify the severity of the belt slippage, and the impact of the belt slippage on belt life. The system can generate a control signal to automatically control the machine in response to the detected belt slippage, and also to notify an operator, in near real-time, of the belt load characteristics, and the impact it may have on belt life.

Figure 1:
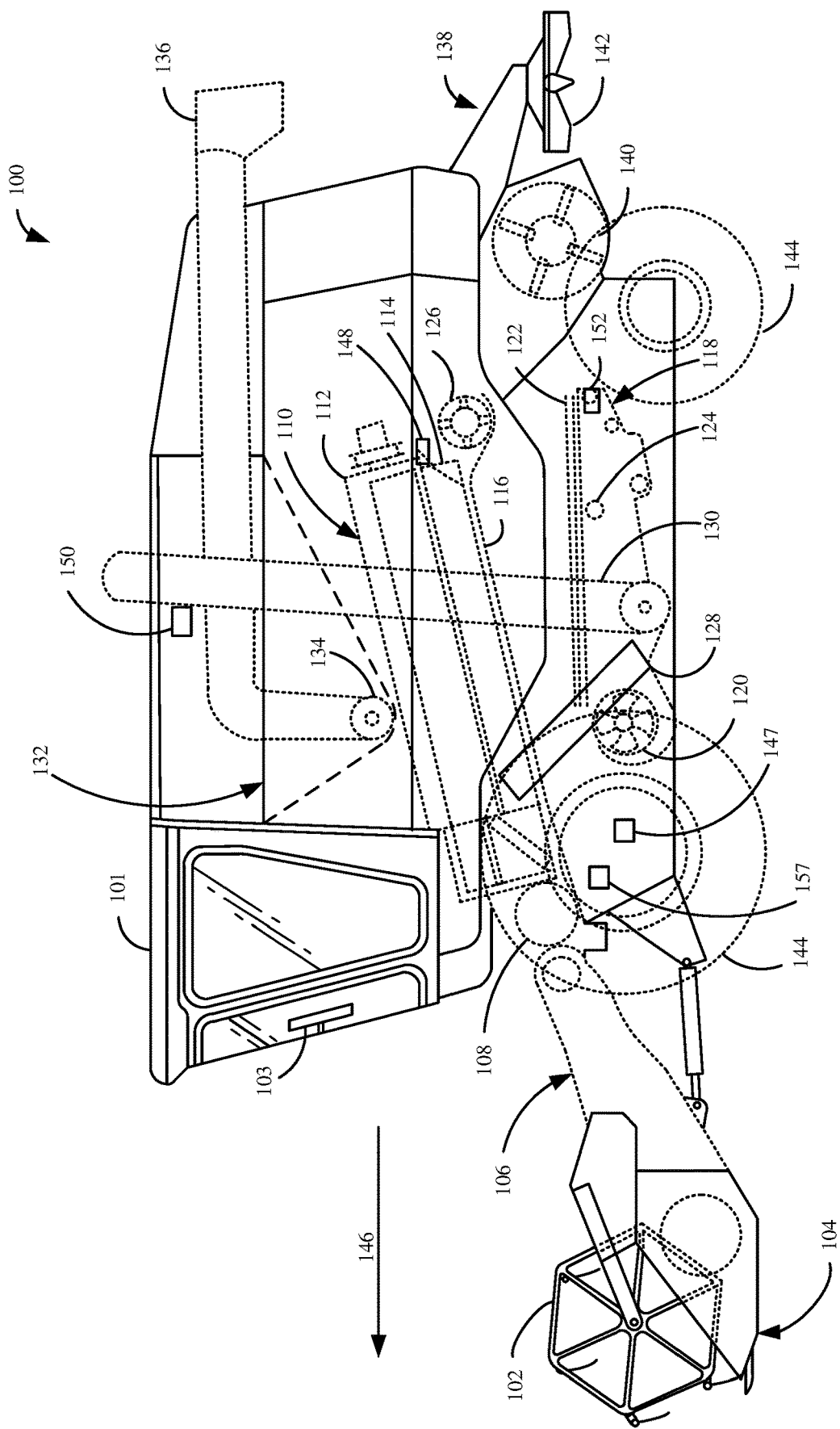
FIG. 1 is a partial pictorial, partial schematic depiction of one example of a combine harvester.

FIG. 1 is a partial pictorial, partial schematic, illustration of an agricultural machine 100, in an example where machine 100 is a combine harvester (or combine). It can be seen in FIG. 1 that combine 100 illustratively includes an operator compartment 101, which can have a variety of different operator interface mechanisms, for controlling combine 100, including display mechanism 103, as will be discussed in more detail below. Combine 100 can include a set of front end equipment that can include header 102, and a cutter generally indicated at 104. It can also include a feeder house 106, a feed accelerator 108, and a thresher generally indicated at 110. Thresher 110 illustratively includes a threshing rotor 112 and a set of concaves 114. Further, combine 100 can include a separator 116 that includes a separator rotor. Combine 100 can include a cleaning subsystem (or cleaning shoe) 118 that, itself, can include a cleaning fan 120, chaffer 122 and sieve 124. The material handling subsystem in combine 100 can include (in addition to a feeder house 106 and feed accelerator 108) discharge beater 126, tailings elevator 128, clean grain elevator 130 (that moves clean grain into clean grain tank 132) as well as unloading auger 134 and spout 136. Combine 100 can further include a residue subsystem 138 that can include chopper 140 and spreader 142. Combine 100 can also have a propulsion subsystem that includes an engine (or other power source) that drives ground engaging wheels 144 or tracks, etc. It will be noted that combine 100 may also have more than one of any of the subsystems mentioned above (such as left and right cleaning shoes, separators, etc.).

Many of the subsystems have belt driven members that are driven by a corresponding belt drive system. For instance, elements in feeder house 106 (such as a feed accelerator) can be belt driven. Rotor 142, cleaning shoe 118 and cleaning fan 120 can also be belt driven. Machine 100 can have an engine fan that is belt driven as well. Further, discharge beater 126, clean grain elevator 130, unloading auger 134 and chopper 140 can be belt driven as well. Also, the belt drive systems may have two or more belts in a series. A wide variety of other items on machine 100 can also be belt driven.

In operation, and by way of overview, combine 100 illustratively moves through a field in the direction indicated by arrow 146. As it moves, header 102 engages the crop to be harvested and gathers it toward cutter 104. After it is cut, it is moved through a conveyor in feeder house 106 toward feed accelerator 108, which accelerates the crop into thresher 110. The crop is threshed by rotor 112 rotating the crop against concaves 114. The threshed crop is moved by a separator rotor in separator 116 where some of the residue is moved by discharge beater 126 toward the residue subsystem 138. It can be chopped by residue chopper 140 and spread on the field by spreader 142. In other implementations, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. That residue can also be moved rearwardly in combine 100 toward the residue handling subsystem 138.

Tailings can be moved by tailings elevator 128 back to thresher 110 where they can be re-threshed. Alternatively, the tailings can also be passed to a separate re-threshing mechanism (also using a tailings elevator or another transport mechanism) where they can be re-threshed as well.

FIG. 1 also shows that, in one example, combine 100 can include ground speed sensor 147, one or more separator loss sensors 148, a clean grain camera 150, and one or more cleaning shoe loss sensors 152, and position sensor 157. Ground speed sensor 147 illustratively senses the travel speed of combine 100 over the ground. This can be done by sensing the speed of rotation of the wheels, the drive shaft, the axel, or other components. The travel speed and position of combine 100 can also be sensed by positioning system 157, such as a global positioning system (GPS), a dead reckoning system, a LORAN system, a cellular triangulation system, or a wide variety of other systems or sensors that provide an indication of travel speed and/or position.

Cleaning shoe loss sensors 152 illustratively provide an output signal indicative of the quantity of grain loss by both the right and left sides of the cleaning shoe 118. In one example, sensors 152 are strike sensors (or impact sensors) which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

It will also be appreciated that sensor and measurement mechanisms (in addition to the sensors already described) can include other sensors on combine 100 as well. For instance, speed sensors can sense a speed of the various belt drive systems in machine 100, and the speed of the belt driven mechanism (the difference in speed between the belt drive and the driven mechanism can be used to identify belt slip). Where multiple belts are in series, the speed sensors can sense the speed of all pulleys in the series system or fewer than all pulleys in the series system. The other sensors can also include an engine RPM sensor, a rotor pressure sensor, and a topography sensor (or this can be obtained from a map, etc.). The other sensors can also include a residue setting sensor that is configured to sense whether machine 100 is configured to chop the residue, drop a windrow, etc. They can include cleaning shoe fan speed sensors that can be configured proximate fan 120 to sense the speed of the fan. They can include a threshing clearance sensor that senses clearance between the rotor 112 and concaves 114. They include a threshing rotor speed sensor that senses a rotor speed of rotor 112. They can include a chaffer clearance sensor that senses the size of openings in chaffer 122. They can include a sieve clearance sensor that senses the size of openings in sieve 124. They can include a material other than grain (MOG) moisture sensor that can be configured to sense the moisture level of the material other than grain that is passing through combine 100. They can include machine setting sensors that are configured to sense the various configurable settings on combine 100. They can also include a machine orientation sensor that can be any of a wide variety of different types of sensors that sense the orientation or pose of combine 100. Crop property sensors can sense a variety of different types of crop properties, such as crop type, crop moisture, and other crop properties. They can also be configured to sense characteristics of the crop as they are being processed by combine 100. For instance, they can sense grain feed rate, as it travels through clean grain elevator 130. They can sense yield as mass flow rate of grain through elevator 130, correlated to a position from which it was harvested, as indicated by position sensor 157, or provide other output signals indicative of other sensed variables. Some additional examples of the types of sensors that can be used are described below.

Figure 2:
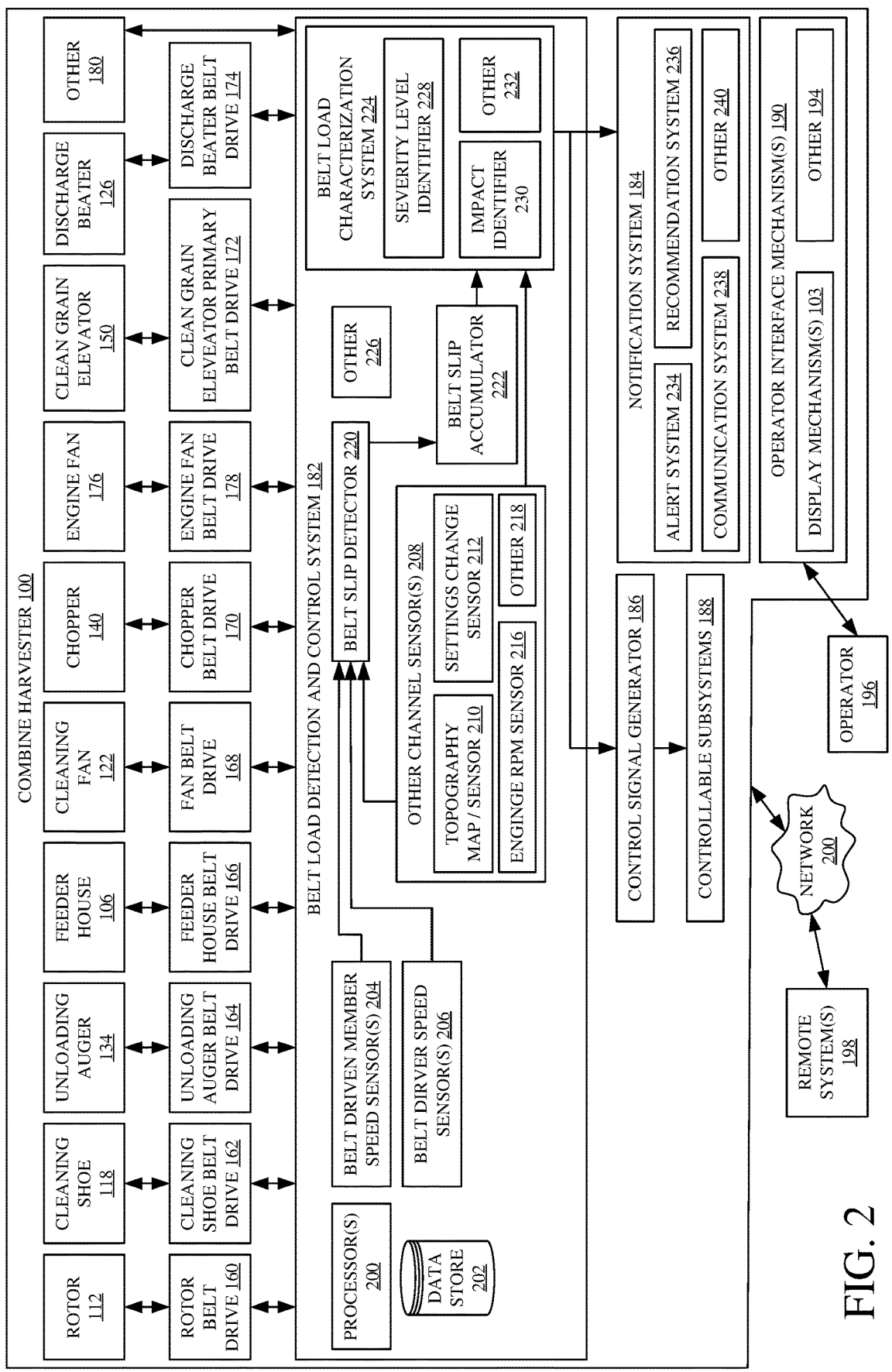
FIG. 2 is a block diagram showing one example of different portions of the combine harvester illustrated in FIG. 1, in more detail.

FIG. 2 is a block diagram showing combine harvester 100, in more detail. Some of the items are similar to those shown in FIG. 1, and they are similarly numbered. Thus, FIG. 2 shows that harvester 100 can include rotor 112, cleaning shoe 118, unloading auger 134, feeder house (and its functionality, such as a feed accelerator) 106, cleaning fan 120, chopper 140, clean grain elevator 130 and discharge beater 126. Each of these items can be driven by a corresponding belt drive system. Thus, such systems can include rotor belt drive 160, cleaning shoe belt drive 162, unloading auger belt drive 164, feeder house belt drive 166, fan belt drive 168, chopper belt drive 170, clean grain elevator primary belt drive 172, and discharge beater belt drive 174. Harvester 100 can also include an engine fan 176 that may be belt driven by an engine fan belt drive 178. There can be a wide variety of other belt driven systems and corresponding belt drive systems, as indicated by block 180.

FIG. 2 also shows that harvester 100 includes belt load detection and control system 182 which can provide outputs to notification system 184 and control signal generator 186. Control signal generator 186 can provide control signals to controllable subsystems 188. Machine 100 can include operator interface mechanisms 190 (which, themselves, can include display mechanisms 103) and a wide variety of other operator interface mechanisms 194. The other operator interface mechanisms 194 can include such things as a touch sensitive display screen, a point and click device, levers, switches, buttons, a steering wheel, joysticks, speech recognition and speech synthesis systems, and any of a wide variety of other audio, visual, haptic and other items. Operator 196 can interact with operator interface mechanisms 190 in order to control and manipulate harvester 100. Similarly, operator interface mechanisms 190 can surface information for operator 196.

FIG. 2 also shows that, in one example, harvester 100 can be communicatively coupled to one or more remote systems 198 over network 200. Remote systems 198 can include a farm manager system, an owner system, a maintenance system, a vendor system, a manufacturer system, etc. Network 200 can be any of a wide variety of different types of networks such as a wide area network, a near field communication network, a cellular communication network, or any of a wide variety of other networks or combinations of networks.

Belt load detection and control system 182 detects and characterizes the load on the different belts in machine 100. It can identify when belts are experiencing an unusual load or characteristic, and it can estimate the impact on belt life and notify the operator 196, in near real-time, so that belt failure can be avoided or addressed as desired.

FIG. 2 shows that belt load detection and control system 182 can include one or more processors 200, data store 202, a plurality of different belt driven member speed sensors 204 and belt driver speed sensors 206, a plurality of other channel sensors 208 (which can include a topography sensor or map 210, one or more settings change sensors 212, rotor pressure sensor 214, engine RPM sensor 216 and other sensors 218), belt slip detector 220, belt slip accumulator 222, and belt load characterization system 224. Belt load detection and control system 182 can include other items 226 as well. In the example shown in FIG. 2, belt load characterization system 224 can include severity level identifier 228, impact identifier 230, and other items 232.

FIG. 2 also shows that notification system 184 can include alert system 234, recommendation system 236, communication system 238 and other items 240. Before describing the overall operation of belt load detection and control system 182, a brief description of some of the items in system 182, and their operation, will first be provided.

Belt driven member speed sensors 204 illustratively sense the speed of the belt driven members. Therefore, for instance, when rotor 112 is the belt driven member, then sensor 204 senses the speed at which rotor 112 is moving. The speed sensor can be a Hall Effect sensor, an angular position sensor, or any of a wide variety of other sensors that generate a signal indicative of the speed at which rotor 112 is moving. In such an example, belt driver speed sensor 206 senses the speed of rotor belt drive 160. Thus, it can also include any desired type of speed sensor that senses the speed that rotor belt drive 160 is moving.

Topography map/sensor 210 can be a sensor that senses the topography of the terrain over which machine 100 is moving (such as an accelerometer, inertial measurement unit, global positioning system, orientation sensor, etc.) and/or it can be a map processing system that obtains a topographical map of the field over which harvester 100 is moving, and extracts the topography from that map. Settings change sensor 212 can be any of a wide variety of different types of sensors that sense the settings on machine 100, and that generates a signal indicative of those settings, so that the signal may be representative of changes to the settings as well.

Rotor pressure sensor 214 illustratively senses the torque on rotor 112, or other variable indicative of rotor pressure. Engine RPM sensor 216 senses the engine RPMs. Other sensors can be used to sense force or other variables.

Belt slip detector 220 can receive the sensor signals and detect when a particular belt is slipping. For instance, it may calculate a derivative of time series values received from belt driven member speed sensor 204 to identify gradients. The gradients in that speed signal may identify belt slip. For instance, if the speed of the rotor 112 changes rapidly (relative to a threshold value), this may indicate a belt slip. Also, as described in greater detail below with respect to FIG. 3, belt slip detector 220 may identify the difference between the speed of rotor belt drive 160 (from belt driver speed sensor 206) and the speed of rotor 112 (from belt driven member speed sensor 204). If the ratio of the speed of the belt drive system to the speed of the belt driven system is unexpected, this may indicate that the belt is slipping as well.

In determining whether a belt slip event has occurred, belt slip detector 220 may also consider information, such as the topography of the field. For instance, it may be that the speed of a belt driven mechanism may change because harvester 100 has begun going uphill. Thus, instead of being due to a belt slip, the speed change may be due to a change in topography. Similarly, the change of some belt driven system may be due to the fact that the operator changes the speed setting for that, or a different, mechanism. Thus, the output from settings change sensor 212 can be considered in determining whether the change in speed is due to a change in settings, or belt slip. The change in speed of a belt driven mechanism may also be due to a change in engine RPMs. Thus, engine RPM sensor 216 can provide an output indicative of that. The rotor pressure may cause a change in speed as well. Thus, rotor pressure sensor 214 can generate a signal indicative of that.

Belt slip detector 220 generates an output indicating the presence and duration of a belt slip. Belt slip accumulator 222 can accumulate the number of belt slips, for each different type of belt, over time. For instance, the severity or impact that a belt slip may have may be affected by the frequency of belt slips, or the number of belt slips or other belt slip characteristics. Thus, belt slip accumulator 222 accumulates the number of belt slips, and the time over which they have occurred. It can accumulate belt slip events for the lifetime of a corresponding belt as well as belt slip events detected over a relatively recent history (such as the last 10 minutes of operation, the last 100 meters of travel, for operation in the current field or when operated by the current operator, or for other criteria indicating a relatively recent history). Accumulator 222 can accumulate any other characteristics, and provide an output indicative of them to belt load characterization system 224. System 224 can also receive the output of belt slip detector 220 and the output of the other channel sensors 208.

Belt load characterization system 224 can characterize the load on the belt to identify whether the load is accelerating the wear on the belt. Severity level identifier 228 identifies the severity level of the belt load characteristic. For instance, if the belt is being frequently loaded and unloaded, due to belt slip, then this may be a relatively severe load characteristic. If the belt slips are relatively infrequent, then this may be a relatively minor load characteristic. In one example, the time series values can be transformed to frequency spectrum values so cyclic loading characteristics can be identified as well.

Impact identifier 230 identifies the impact of the load characteristic on belt life. For instance, if the load characteristic has a high severity level, this may indicate that the impact on belt life may be relatively significant compared to a belt load characteristic that is more modest. Impact identifier 230 can provide an output indicating, for instance, the remaining belt life of the identified belt, an estimate of when the belt will fail, given its current load characteristics, an indicator that the belt is undergoing severe, moderate or light wear characteristics or other information indicating the impact of the belt load characteristics and their severity level.

In notification system 184, alert system 234 can generate a wide variety of different types of alerts, on operator interface mechanisms 190. The alerts can be audio, visual, haptic or other alerts. Recommendation system 236 illustratively identifies recommendations for operator 196, based upon the output from belt load characterization system 224. For instance, if the output from system 224 indicates that a belt failure of a particular belt is imminent, then recommendation system 236 may generate a recommendation indicating that operator 196 should immediately call maintenance personnel to perform a belt replacement. If the output indicates that a belt failure will occur in the not-too-distant future, but is not imminent, the recommendation may be to have the belt serviced at the next service appointment for harvester 100. These are just two examples of recommendations and a wide variety of other recommendations can be generated as well.

Communication system 238 can communicate with remote system 198 over network 200. For instance, communication system 238 can automatically generate a communication to a belt vendor to order a belt that is in danger of failing. Communication system 238 can generate a communication to a farm manager or maintenance system indicating the status of the various belts on harvester 100. These are just examples as well.

Figure 3:
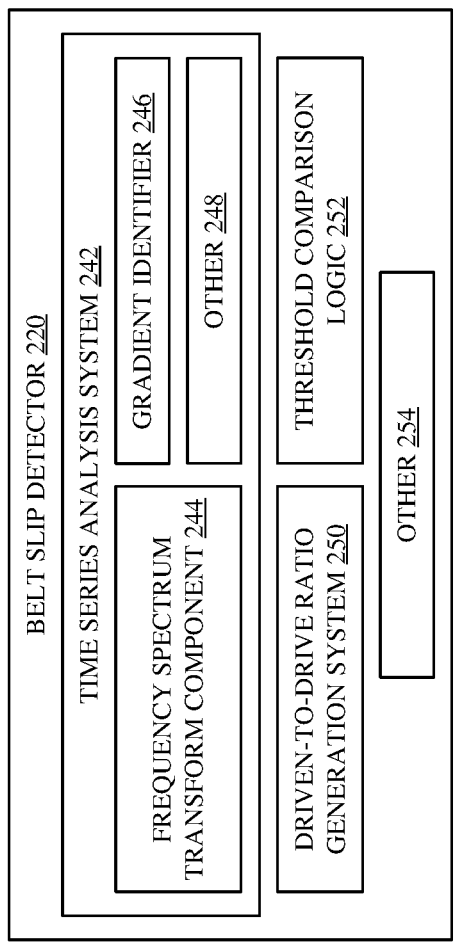
FIG. 3 is a block diagram showing one example of a belt slip detector, in more detail.

FIG. 3 shows a block diagram of one example of belt slip detector 220, in more detail. FIG. 3 shows that belt slip detector 220 can include time series analysis system 242 which, itself, can include frequency spectrum transform component 244, gradient identifier 246 and other items 248. Belt slip detector 220 can also, or instead, include drive-to-driven ratio generation system 250, threshold comparison logic 252, and a wide variety of other items 254.

Frequency spectrum transform component 244 can receive a speed input from one of sensors 204 and transform it into a frequency spectrum signal. Frequency analysis can then be performed by belt load characterization system 224 to identify cyclic loading characteristics on the belt.

Gradient identifier 246 can identify the gradients in the time series speed values. Based upon those gradients, time series analysis system 242 determines whether a belt slip has occurred. In one example, threshold comparison logic 252 compares the gradients identified by gradient identifier 246 to threshold gradient values, and time series analysis system 242 determines whether a belt slip has occurred based upon the comparison.

In another example, driven-to-drive ratio generation system 250 identifies a ratio of the speed signals generated by belt driven member speed sensor 204 and belt drive speed sensor 206. The ratio may show that the belt driven member is being driven more slowly than expected, given the speed of the belt drive member. Thus, the ratio of these two values identified by system 250 may be indicative of belt slip. Again, threshold comparison logic 252 can compare the drive-to-drive ratio to a threshold value for that ratio, and system 250 can identify whether a belt slip is occurring based upon that comparison. In another example, gradient identifier 246 identifies a peak gradient value during a belt slip event, and severity level identifier 228 can use the peak value to identify a severity level of the belt slip event. In yet another example, gradient identifier 246 generates a distribution of gradient values over a recent history and/or over the lifetime of the belt. The distribution can be used to identify the severity level as well.

Figure 4:
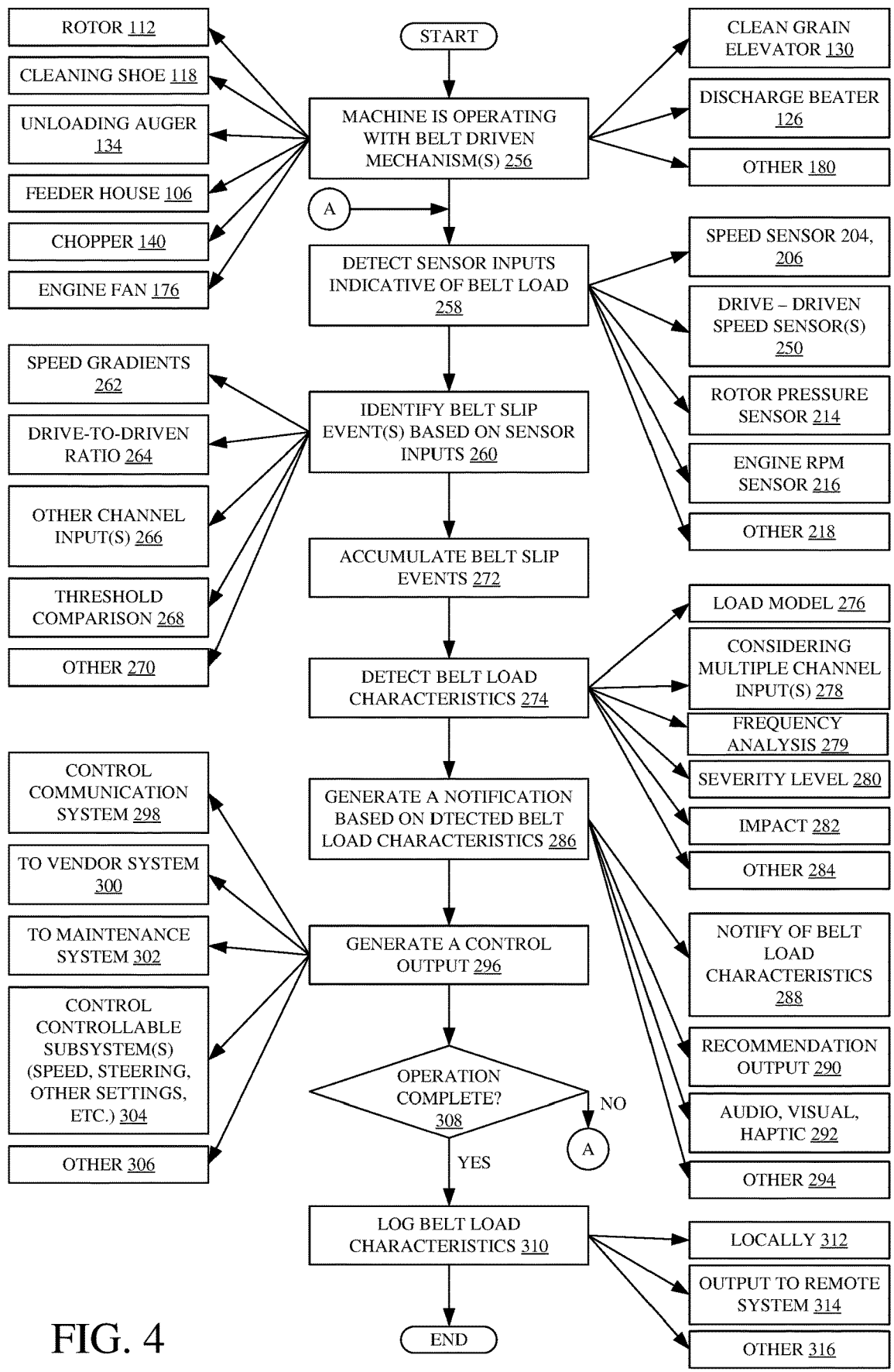
FIG. 4 is a flow diagram illustrating one example of the operation of the belt load detection and control system shown in FIG. 2, in detecting belt load and generating a control signal based upon the detected belt load.

FIG. 4 is a flow diagram illustrating one example of the operation of harvester 100 in identifying belt load characteristics and generating output and control signals based upon those characteristics. It is first assumed that machine 100 is operating with belt driven mechanisms. This is indicated by block 256 in the flow diagram of FIG. 4. Again, the belt driven mechanisms can include such things as rotor 112, cleaning shoe 118, unloading auger 134, feeder house 106, chopper 140, engine fan 176, clean grain elevator 130, discharge beater 126, or a wide variety of other items 180.

Belt slip detector 220 and belt load characterization system 224 then detects sensor inputs indicative of different belt load characteristics. This is indicated by block 258 in the flow diagram of FIG. 4. Those inputs can be from speed sensors 204, 206, the information can be from driven-to-drive ratio generation system 250, it can be from rotor pressure sensor 214 or other force sensors, from engine RPM sensor 216 or from a wide variety of other sensors 218 (some of which are discussed above).

Belt slip detector 220 then identifies belt slip events for different belts based upon the sensor inputs. This is indicated by block 260 in the flow diagram of FIG. 4. Again, this can be based on a speed gradient 262 of a single speed signal (such as a signal from sensors 204). The speed gradients can be accumulated to generate a distribution of gradient values over a recent history of operation, they can be representative of a peak gradient value, and/or they can be other gradient values as well. The belt slip events can be identified based on the drive-to-driven ratio 264. It can be identified while considering the other channel inputs from other channel sensors 208. This is indicated by block 266. It can be based on threshold comparisons 268 of threshold comparison logic 252 where the threshold values can be stored in, and accessed from, data store 202, remote systems 198, or elsewhere. It can be based on a wide variety of other sensor inputs or other inputs 270.

Belt slip accumulator 222 then accumulates the various belt slip events for the different belts that are being monitored. The belt slip events can be accumulated over different time periods (recent history or longer term or over a belt lifetime). This is indicated by block 272 in the flow diagram of FIG. 4.

Belt load characterization system 224 then detects the different belt load characteristics from the inputs from belt slip detector 220, belt slip accumulator 222, and other channel sensors 208. This is indicated by block 274. In one example, system 224 includes a machine learned or empirically learned load model that takes the various inputs and classifies them into one of a number of different belt load characteristics. The load model can model belt damage using load magnitudes and the number of load event cycles. The belt damage model can be calibrated and/or adjusted using empirical data. In addition, machine learning can use slip events, speed gradients, and other context signals from sensors 208 or elsewhere, to improve the model. Characterizing the belt load using a load model is indicated by block 276.

The model can also consider the multiple different input channels as indicated by block 278. Severity level identifier 228 can also perform frequency analysis on the data to identify the severity of cyclic load characteristics. This is indicated by block 279. Severity level identifier 228 can also be a classifier or other logic that identifies a severity level of the belt load characteristics identified by belt load characterization system 224. Identifying the severity level is indicated by block 280. Impact identifier 230 then identifies the impact of the characteristic, based upon the identity of the belt load characteristic and its severity level. This is indicated by block 282. The belt load characteristics can be identified in other ways as well, and this is indicated by block 284.

Notification system 184 then generates a notification based upon the detected belt load characteristics. This is indicated by block 286. Notifying operator 196 or other remote systems 198 of the various belt load characteristics, themselves, is indicated by block 288. Recommendation system 236 can identify various recommendations, as indicated by block 290, and alert system 234 can generate different audio, visual or haptic alerts. This is indicated by block 292. Notification system 184 can generate a wide variety of other notifications using communication system 238 or otherwise, and those notifications can be sent to any of a wide variety of other systems as well. This is indicated by block 294.

Control signal generator 186 can also generate control signals to control one or more of the controllable subsystems 188. It can generate control signals to control communication system 238 as well. Generating a control output is indicated by block 296 in the flow diagram of FIG. 4. Controlling communications system 238 is indicated by block 298. Communication system 238 can be used to communicate with remote systems 198, such as vendor systems 300 and/or maintenance systems 302. Controlling controllable subsystems 188 can be done to control a propulsion system (e.g., machine speed), a steering system, other machine settings, among other things. This is indicated by block 304. The control output can take a wide variety of other forms as well, and this is indicated by block 306.

Until operation is complete, as indicated by block 308, processing then reverts to block 258 where the system continues to receive sensor inputs indicative of belt load.

Once the operation is complete, or intermittently during the operation, belt load detection and control system 182 logs the belt load characteristics for the various belts being monitored. This is indicated by block 310. The log can be generated locally in data store 202, as indicated by block 312. It can also be generated at a remote system 198, as indicated by block 314. The log can be generated in a wide variety of other ways as well, and this is indicated by block 316. This information can be incorporated into maintenance schedules or other information corresponding to the machine 100 and/or generator 196.

In this way, a near real-time monitor can be used to detect belt load characteristics of a variety of different belts on machine 100. This information can be displayed, or otherwise surfaced, in near real-time, to operator 196. It can be sent to other systems as well. This information can also be used to control machine 100 in other ways.

It will also be noted that, in an example where the belt driven system is a series system with multiple belts driven in series, then, if there is not a speed sensor for each pulley in the system, the belt slip/load information may be for the system as a whole, which is still very useful. This and other configurations are contemplated herein.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
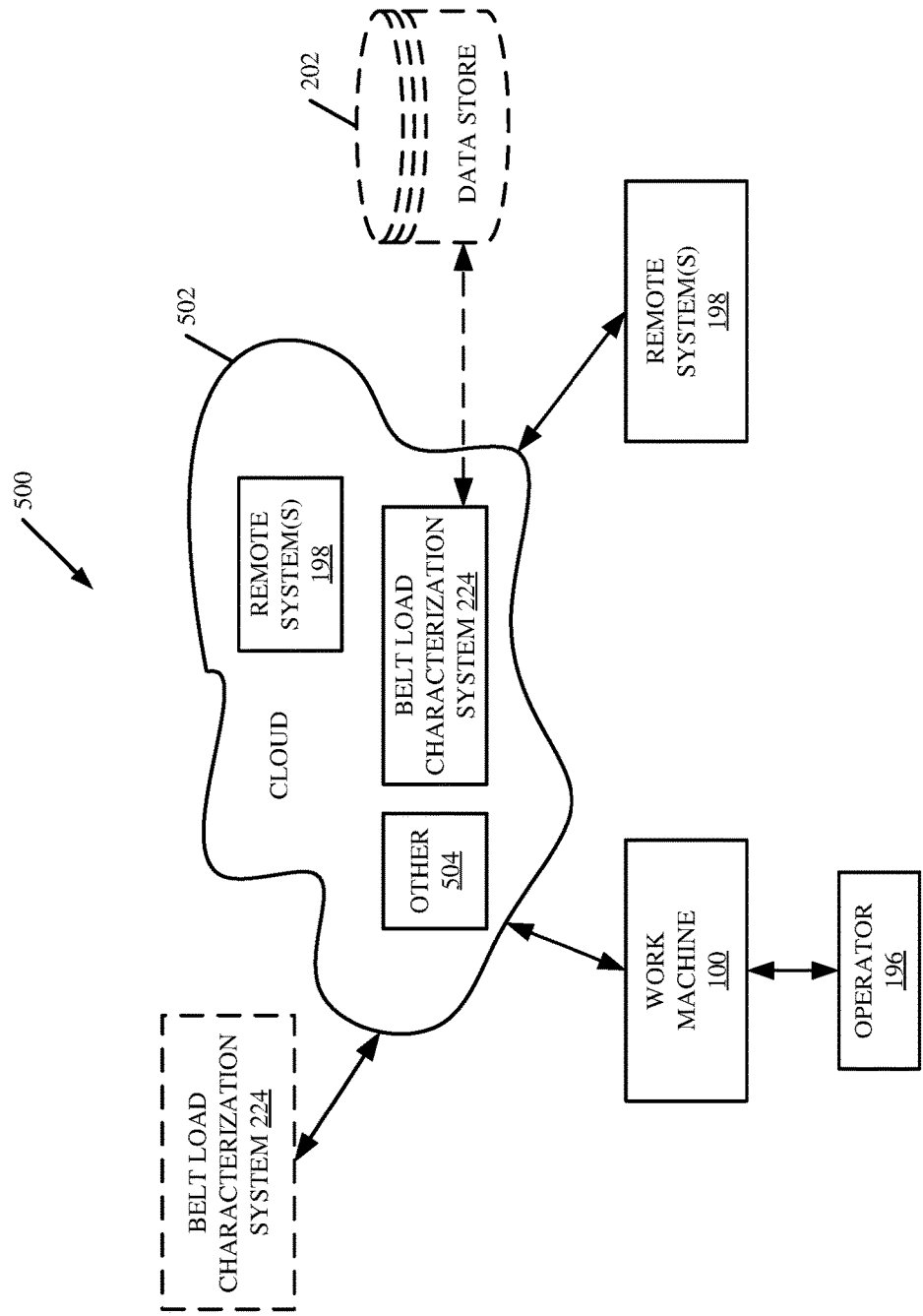
FIG. 5 shows one example of the combine harvester depicted in previous figures, deployed in a remote server architecture.

FIG. 5 is a block diagram of harvester 100, shown in previous figures, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in other FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 5, some items are similar to those shown in other figures and they are similarly numbered. FIG. 5 specifically shows that remote system 198, belt load characterization system 224, data store 202 and other items 504 can be located at a remote server location 502. Therefore, harvester 100 accesses those systems through remote server location 502.

FIG. 5 also depicts another example of a remote server architecture. FIG. 5 shows that it is also contemplated that some elements of previous FIG.s are disposed at remote server location 502 while others are not. By way of example, data store 202 or system 224 can be disposed at a location separate from location 502, and accessed through the remote server at location 502. Regardless of where they are located, they can be accessed directly by harvester 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. All of these architectures are contemplated herein.

It will also be noted that the elements of previous figures, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
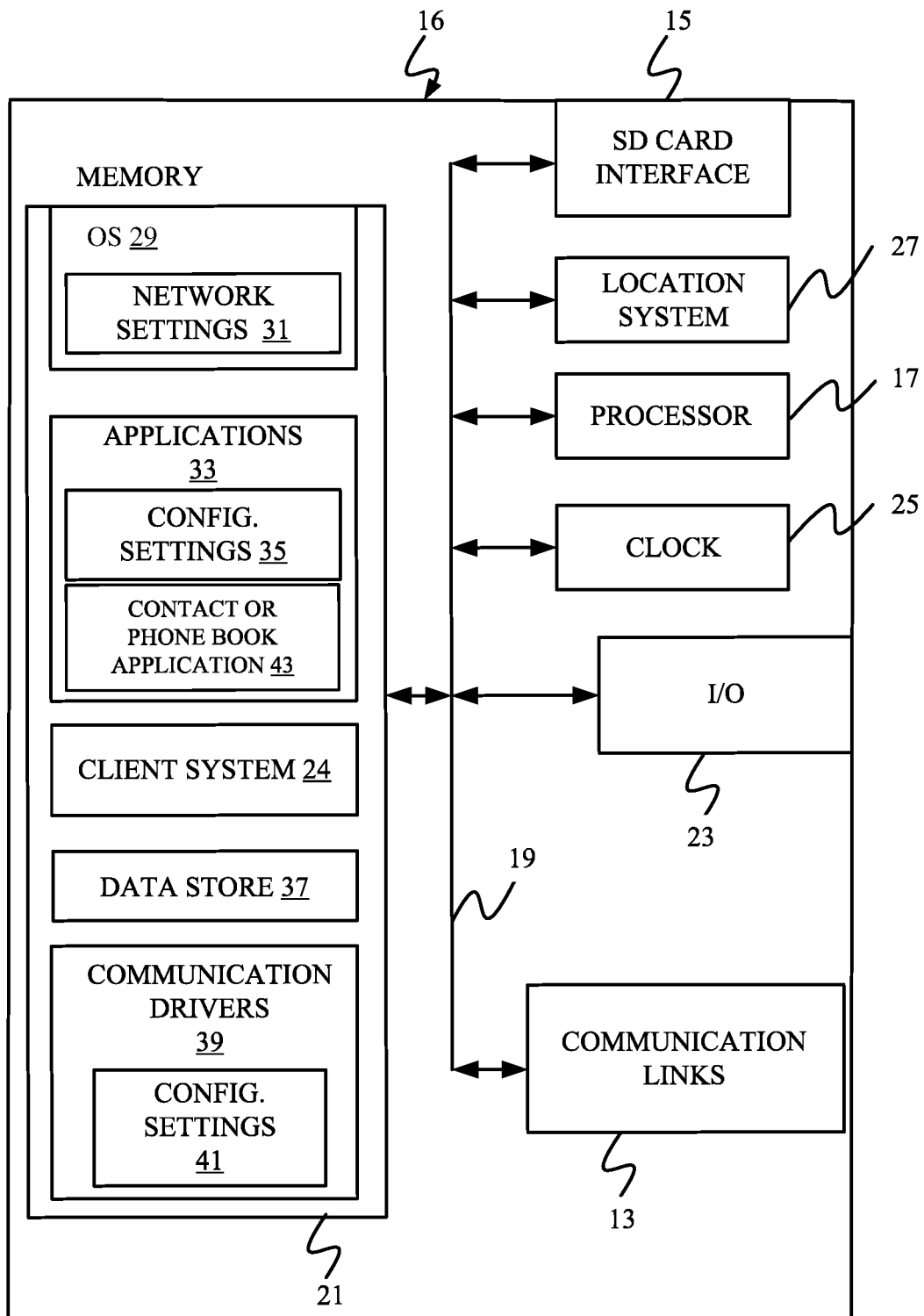
FIGS. 6-8 show examples of mobile devices that can be used as operator interface mechanisms, or in other ways.
Figure 7:
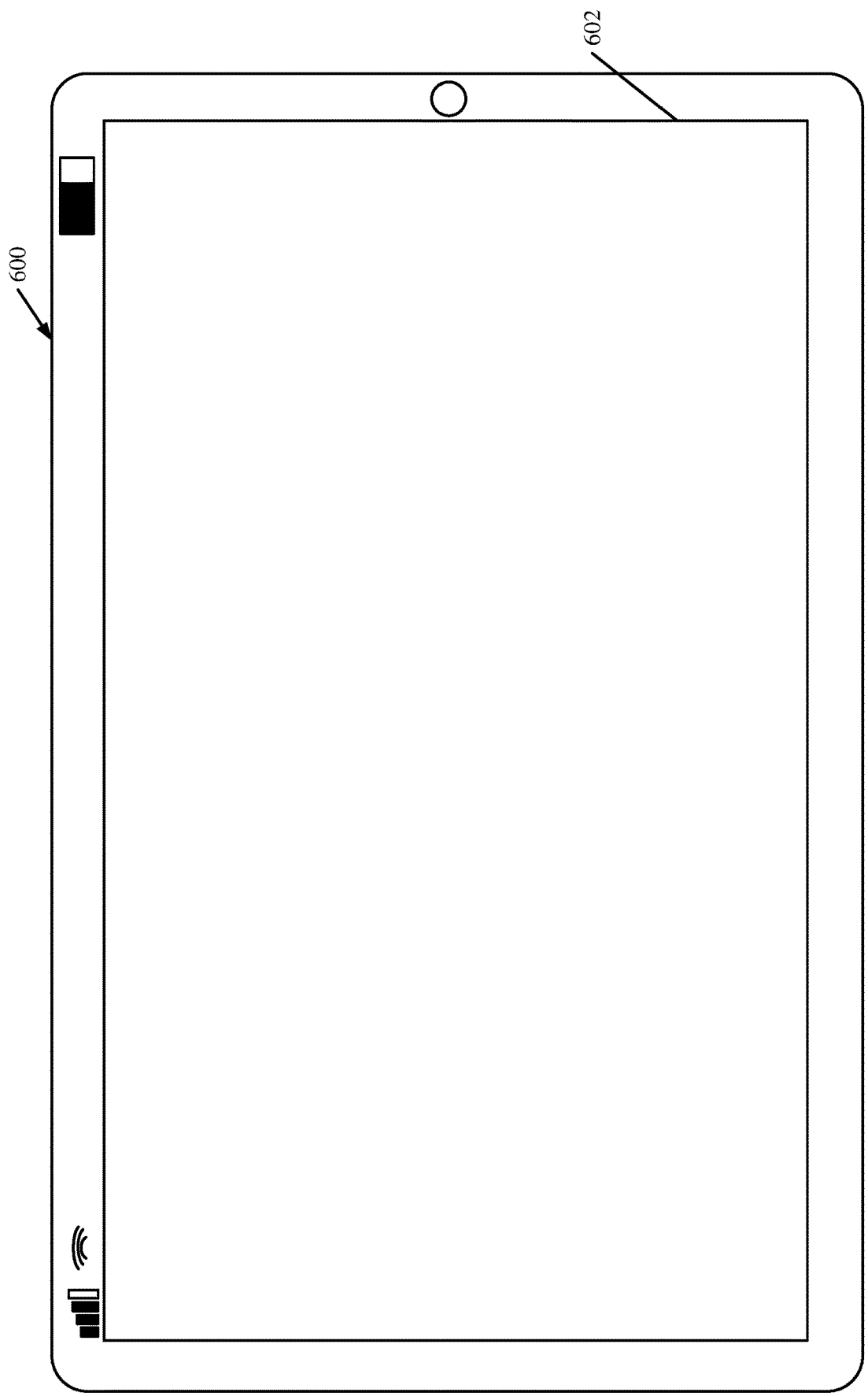
Figure 8:
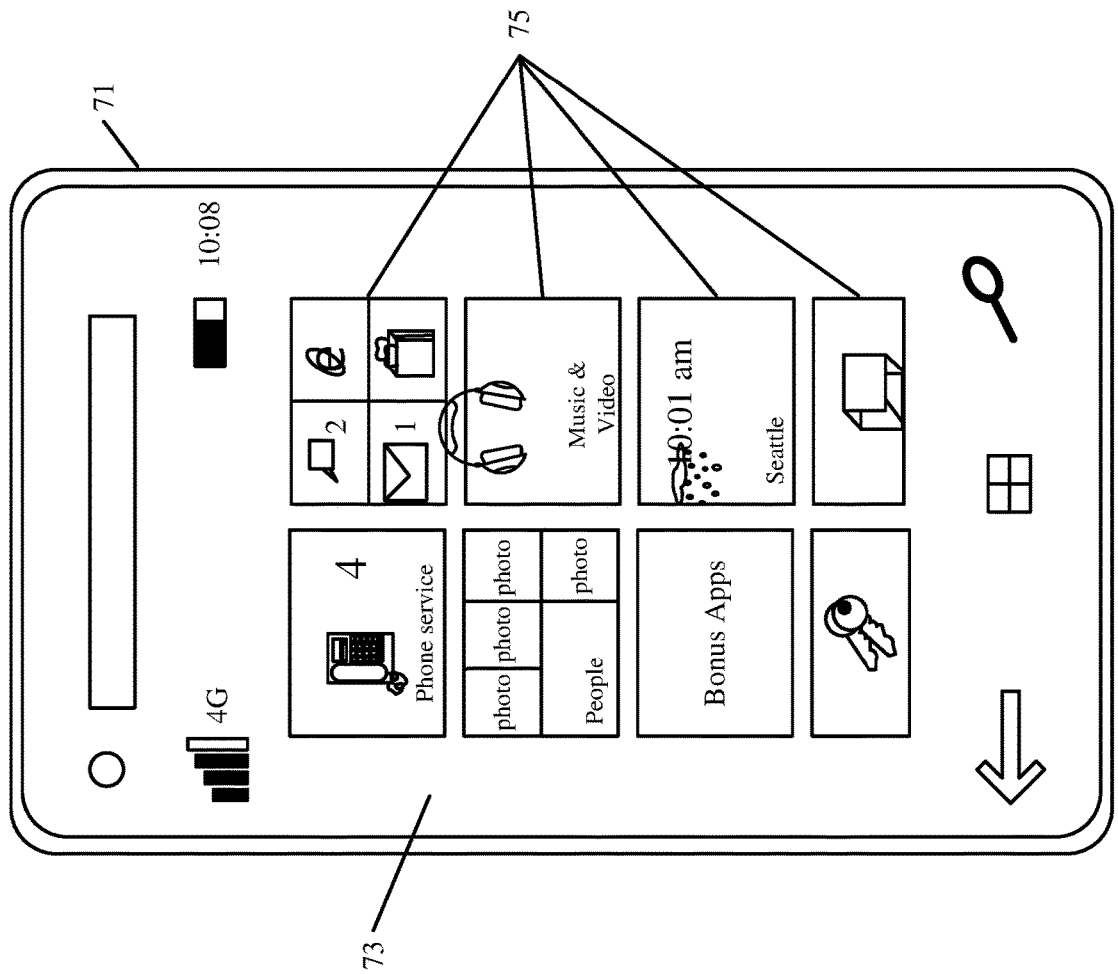
Figure 9:
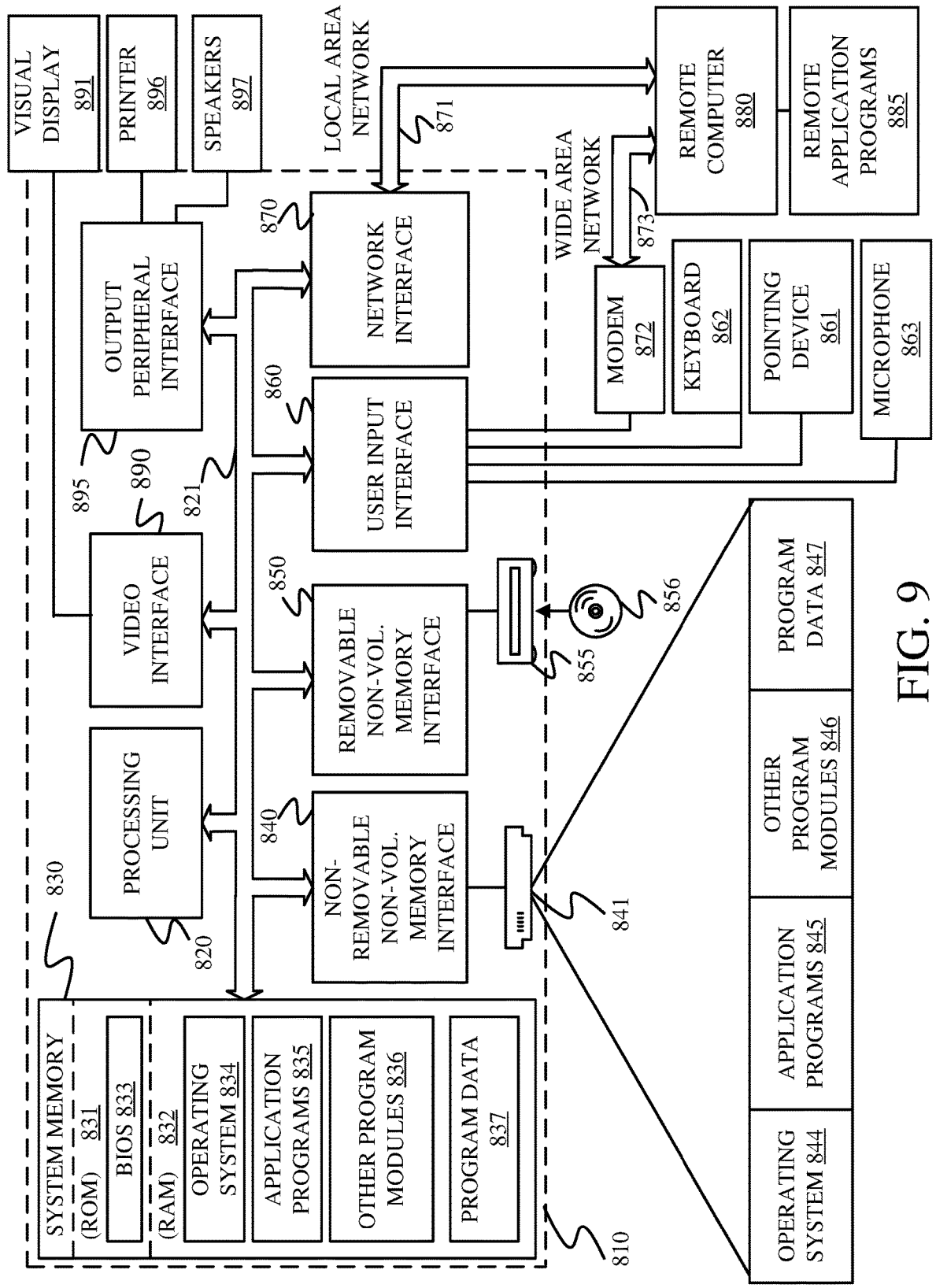
FIG. 9 is a block diagram showing one example of a computing environment that can be used in the systems shown in previous figures.

FIG. 6 is a simplified block diagram of one illustrative example of a handheld or mobile computing device that can be used as a user's or client's hand held device 16, in which the present system (or parts of it) can be deployed. For instance, a mobile device can be deployed in the operator compartment of harvester 100 for use in generating, processing, or displaying data and receiving operator inputs. FIGS. 7-9 are examples of handheld or mobile devices.

FIG. 6 provides a general block diagram of the components of a client device 16 that can run some components shown in previous figures, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors from other figures) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 7 shows one example in which device 16 is a tablet computer 600. In FIG. 7, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

FIG. 9 is one example of a computing environment in which elements of previous figures, or parts of them, (for example) can be deployed. With reference to FIG. 9, an example system for implementing some embodiments includes a computing device in the form of a computer 810 programmed to operate as discussed above. Components of computer 810 may include, but are not limited to, a processing unit 820 (which can comprise processors from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Program-specific Standard Products (e.g., ASSPs), Application-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 9 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a combine harvester, comprising:
a belt driven mechanism;
a belt driver that uses a belt to drive the belt driven mechanism;
a speed sensor that senses a driven mechanism speed variable indicative of a speed of the belt driven mechanism and generates a driven mechanism speed signal based on the driven mechanism speed variable;
a belt load detection system that identifies, based on the driven mechanism speed signal, a belt load characteristic of a load on the belt; and
a notification system that generates a near real time indication to an operator, based on the belt load characteristic.

Example 2 is the combine harvester of any or all previous examples wherein the belt load detection system comprises:
a belt slip detector that detects a belt slip event based on the driven mechanism speed signal and generates a belt slip signal indicative of the detected belt slip event.

Example 3 is the combine harvester of any or all previous examples wherein the belt load detection system comprises:
a time series analysis system that senses belt slip based on a time series of values of the driven mechanism speed variable indicated by the driven mechanism speed signal.

Example 4 is the combine harvester of any or all previous examples wherein the time series analysis system comprises:
a gradient identifier that is configured to identify a gradient value for a gradient in the time series of values; and
threshold comparison logic configured to compare the gradient value to a gradient threshold value, the belt load detection system identifying the belt load characteristic based on the comparison.

Example 5 is the combine harvester of any or all previous examples and further comprising:
a belt driver speed sensor that senses a belt driver variable indicative of a speed at which the belt is driven by the belt driver and generates a driver speed signal based on the sensed belt driver variable.

Example 6 is the combine harvester of any or all previous examples wherein the belt slip detector comprises:
a driven-to-drive ratio generation system that identifies a ratio value indicative of a ratio of the belt driver variable relative to the driven mechanism speed variable; and
threshold comparison logic that compares the ratio value to a ratio value threshold, the belt slip detector detecting a belt slip event based on the comparison.

Example 7 is the combine harvester of any or all previous examples wherein the belt load detection system comprises:
a belt slip accumulator that receives the belt slip signal and accumulates belt slip events over time for the belt.

Example 8 is the combine harvester of any or all previous examples wherein the belt load detection system comprises:
a belt load characterization system that generates the belt load characteristic based on the belt slip signal and the accumulated belt slips.

Example 9 is the combine harvester of any or all previous examples wherein the belt slip accumulator accumulates a recent history of belt slip events and a lifetime total of belt slip events for the belt and wherein the belt load characterization system generates the belt load characteristic based on the recent history of belt slip events.

Example 10 is the combine harvester of any or all previous examples wherein the belt load characterization system comprises:
a severity level identifier that identifies a severity level of the belt load characteristic, based on an affect of the belt load characteristic on belt life, and generates a severity level output signal indicative of the identified severity level.

Example 11 is the combine harvester of any or all previous examples wherein the gradient identifier identifies a peak gradient value during the belt slip event and wherein the severity level identifier identifies the severity level of the belt load characteristic based on the peak gradient value during the slip event.

Example 12 is the combine harvester of any or all previous examples wherein the gradient identifier generates a distribution of gradient values over a recent history and wherein the severity level identifier identifies generates the severity level based on the distribution of gradient values over the recent history.

Example 13 is the combine harvester of any or all previous examples and further comprising:
a force sensor that generates a force sensor signal indicative of a sensed force variable, the sensed force variable being indicative of a force exerted on the belt by the belt slip event, wherein the severity level identifier identifies the severity level based on the sensed force variable.

Example 14 is the combine harvester of any or all previous examples wherein the belt load characterization system comprises:
an impact identifier that identifies an impact of the belt load characteristic on belt life, based on the belt load characteristic and the severity level and the life time total of belt slip events and generates an impact output signal indicative of the identified impact.

Example 15 is the combine harvester of any or all previous examples wherein the gradient identifier accumulates a lifetime history of gradient values corresponding to the belt and wherein the impact identifier identifies an impact of the lifetime history of gradient values on the belt life and generates the impact output signal based on the impact of the lifetime history of gradient values on the belt life.

Example 16 is the combine harvester of any or all previous examples and further comprising:
a channel sensor that generates a channel sensor signal indicative of a regularly sampled variable or control state that changes with time, wherein the belt load characterization system generates the belt load characteristic based on the channel sensor signal.

Example 17 is the combine harvester of any or all previous examples wherein the channel sensor comprises at least one of:
an engine RPM sensor that senses engine speed;
a topography identifier that identifies topography of terrain over which the combine harvester is traveling; or
a setting change identifier that identifies setting changes on the combine harvester.

Example 18 is the combine harvester of any or all previous examples and further comprising an operator interface mechanism and wherein the notification system comprises:
a recommendation system that controls the operator interface mechanism to surface a recommended action based on the belt load characteristic.

Example 19 is the combine harvester of any or all previous examples and further comprising:
a frequency spectrum transform component that transforms the time series of values into a frequency spectrum representation of the time series of values, wherein the belt load detection system identifies the belt load characteristic as a cyclic loading characteristic indicative of cyclic loading on the belt due to belt slip events.

Example 20 is a computer implemented method of controlling a combine harvester, comprising:
sensing a driven mechanism speed variable indicative of a speed of a belt driven mechanism that is driven, using a belt, by a belt driver;
generating a driven mechanism speed signal based on the driven mechanism speed variable;
identifying, based on the driven mechanism speed signal, a belt load characteristic of a load on the belt; and
generating a near real time indication to an operator, based on the belt load characteristic.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A combine harvester, comprising:
a belt driven mechanism;
a belt driver configured to use a belt to drive the belt driven mechanism;
a speed sensor configured to sense a driven mechanism speed variable indicative of a speed of the belt driven mechanism and to generate a driven mechanism speed signal based on the driven mechanism speed variable;
a gradient identifier that is configured to identify a gradient value for a gradient in a time series of values of the driven mechanism speed variable indicated by the driven mechanism speed signal;
threshold comparison logic configured to compare the gradient value to a gradient threshold value;

a belt load detection system configured to identify, based on the comparison of the gradient value to the gradient threshold, a belt load characteristic of a load on the belt; and
a notification system that generates a near real time indication to an operator, based on the belt load characteristic.

2. The combine harvester of claim 1 and further comprising:
a belt driver speed sensor configured to sense a belt driver variable indicative of a speed at which the belt is driven by the belt driver and to generate a driver speed signal based on the sensed belt driver variable.

3. The combine harvester of claim 2 and further comprising a belt slip detector configured to detect a belt slip event and to generate a belt slip signal indicative of the detected belt slip event, wherein the belt slip detector comprises:
a driven-to-drive ratio generation system configured to identify a ratio value indicative of a ratio of the belt driver variable relative to the driven mechanism speed variable; and
wherein the threshold comparison logic is further configured to compare the ratio value to a ratio value threshold, the belt slip detector detecting a belt slip event based on the comparison of the ratio value to the ratio value threshold.

4. The combine harvester of claim 3 wherein the belt load detection system comprises:
a belt slip accumulator configured to receive the belt slip signal and to accumulate belt slip events over time for the belt.

5. The combine harvester of claim 4 wherein the belt load detection system comprises:
a belt load characterization system configured to characterize the belt load characteristic based on the belt slip signal and the accumulated belt slips.

6. The combine harvester of claim 5 wherein the belt slip accumulator is configured to accumulate a recent history of belt slip events and a lifetime total of belt slip events for the belt and wherein the belt load characterization system is configured to characterize the belt load characteristic based on the recent history of belt slip events.

7. The combine harvester of claim 6 wherein the belt load characterization system comprises:
a severity level identifier configured to identify a severity level of the belt load characteristic, based on an affect of the belt load characteristic on belt life, and to generate a severity level output signal indicative of the identified severity level.

8. The combine harvester of claim 7 wherein the gradient identifier is configured to identify a peak gradient value during the belt slip event and wherein the severity level identifier identifies the severity level of the belt load characteristic based on the peak gradient value during the belt slip event.

9. The combine harvester of claim 7 wherein the gradient identifier is configured to generate a distribution of gradient values over a recent history and wherein the severity level identifier is configured to identify the severity level based on the distribution of gradient values over the recent history.

10. The combine harvester of claim 9 and further comprising:
a force sensor configured to generate a force sensor signal indicative of a sensed force variable, the sensed force variable being indicative of a force exerted on the belt by the belt slip event, wherein the severity level identifier is configured to identify the severity level based on the sensed force variable.

11. The combine harvester of claim 7 wherein the belt load characterization system comprises:
an impact identifier configured to identify an impact of the belt load characteristic on belt life, based on the belt load characteristic and the severity level and the life time total of belt slip events and to generate an impact output signal indicative of the identified impact.

12. The combine harvester of claim 11 wherein the gradient identifier is configured to accumulate a lifetime history of gradient values corresponding to the belt and wherein the impact identifier is configured to identify an impact of the lifetime history of gradient values on the belt life and to generate the impact output signal based on the impact of the lifetime history of gradient values on the belt life.

13. The combine harvester of claim 12 and further comprising:
a channel sensor configured to generate a channel sensor signal indicative of a regularly sampled variable or control state that changes with time, wherein the belt load characterization system is configured to characterize the belt load characteristic based on the channel sensor signal.

14. The combine harvester of claim 13 wherein the channel sensor comprises at least one of:
an engine RPM sensor configured to sense engine speed;
a topography identifier configured to identify topography of terrain over which the combine harvester is traveling; or
a setting change identifier configured to identify setting changes on the combine harvester.

15. The combine harvester of claim 5 and further comprising an operator interface mechanism and wherein the notification system comprises:
a recommendation system configured to control the operator interface mechanism to surface a recommended action based on the characterization of the belt load characteristic.

16. The combine harvester of claim 1 and further comprising:
a frequency spectrum transform component configured to transform the time series of values into a frequency spectrum representation of the time series of values, wherein the belt load detection system is configured to identify the belt load characteristic as a cyclic loading characteristic indicative of cyclic loading on the belt due to belt slip events.

17. A computer implemented method of controlling a combine harvester, comprising:
sensing a driven mechanism speed variable indicative of a speed of a belt driven mechanism that is driven, using a belt, by a belt driver;
generating a driven mechanism speed signal based on the driven mechanism speed variable;
identifying a gradient value for a gradient in a time series of values of the driven mechanism speed variable indicated by the driven mechanism speed signal;
comparing the gradient value to a gradient threshold value;
identifying, based on the comparison of the gradient value to the gradient threshold value, a belt load characteristic of a load on the belt; and
generating a near real time indication to an operator, based on the belt load characteristic.

18. A combine harvester, comprising:
a belt driven mechanism;
a belt driver that uses a belt to drive the belt driven mechanism;
a speed sensor that senses a driven mechanism speed variable indicative of a speed of the belt driven mechanism and generates a driven mechanism speed signal based on the driven mechanism speed variable;
a time series analysis system that senses belt slip events based on a time series of values of the driven mechanism speed variable indicated by the driven mechanism speed signal;
a frequency spectrum transform component that transforms the time series of values into a frequency spectrum representation of the time series of values;
a belt load detection system that identifies a cyclic loading characteristic indicative of cyclic loading on the belt due to belt slip events; and
a notification system that generates a near real time indication to an operator, based on the cyclic loading characteristic.

\* \* \* \* \*